A. H. HENDERSON.
CUSHION TIRED WHEEL.
APPLICATION FILED AUG. 14, 1911.

1,194,177.    Patented Aug. 8, 1916.

Witnesses
Charles Lowell Howard
H. P. Roberts

Inventor:
Albert H. Henderson,

UNITED STATES PATENT OFFICE.

ALBERT H. HENDERSON, OF BALTIMORE, MARYLAND, ASSIGNOR TO THE HENDERSON RUBBER COMPANY, OF BALTIMORE, MARYLAND, A CORPORATION OF MARYLAND.

CUSHION-TIRED WHEEL.

1,194,177.  Specification of Letters Patent.  Patented Aug. 8, 1916.

Application filed August 14, 1911. Serial No. 644,061.

*To all whom it may concern:*

Be it known that I, ALBERT H. HENDERSON, a citizen of the United States, residing at Baltimore, State of Maryland, have invented new and useful Improvements in Cushion-Tired Wheels, of which the following is a specification.

My invention relates to an improved resilient airless-tired wheel especially designed for use with automobiles, although adapted for vehicles of other classes.

In carrying out my invention I produce an airless tire capable of use in light or heavy traffic, and which when employed with a rim of novel construction is capable of high degree of compression without injury to the material constituting the tire or impairment of its elastic force. In order to accomplish such results I have found it necessary that there shall be a certain reciprocative constructional arrangement between the resilient tire and the inflexible rim, whereby the former under compression shall be allowed to change its shape and slide inwardly or laterally upon the surface of the rim binding or clamping thereon, said rim, under conditions of complete or partial compression of the tire, forming a firm seat therefor without in any degree lessening the clamping action. While the elasticity or inherent yielding movement of the tire is increased, a sufficient area in cross section of solid surface is retained whereby the tire is given great resistance, evenness in running and facility of adapting itself to the numerous shocks, inducing partial compression, due to encountering obstructions in the path of travel, and an equal facility of resuming normal shape after the passage of such obstructions.

Reference is now made to the accompanying drawing in which—

Figure 1:
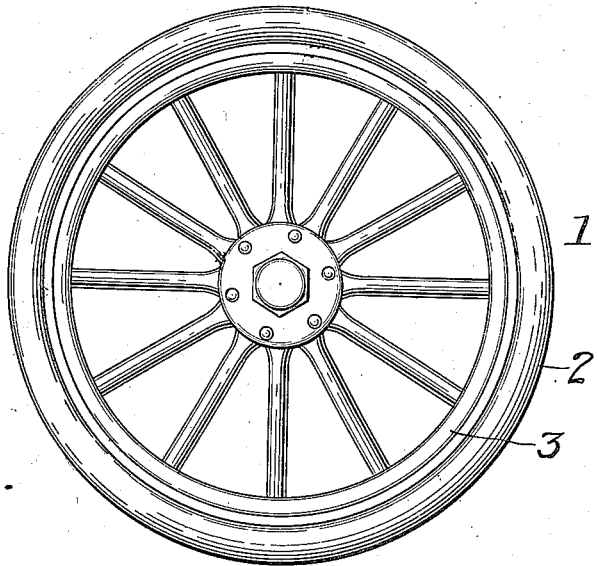
Figure 2:
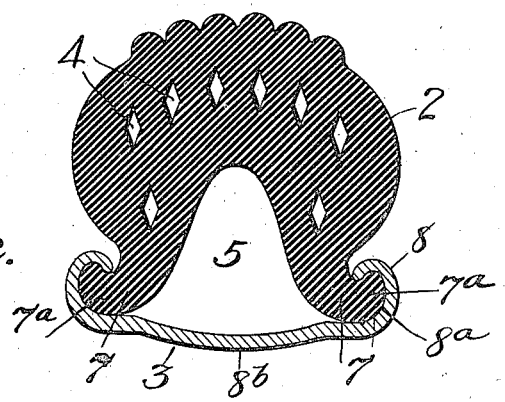
Figure 3:
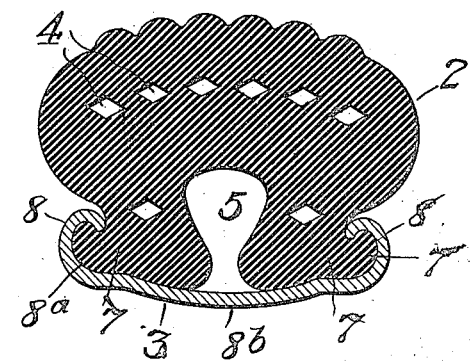

Figure 1 is a side elevation of a wheel embodying my invention. Fig. 2 is a transverse section of the tire and rim showing the former in its normal or uncompressed state. Fig. 3 is a similar view showing the resilient tire in a state of maximum compression.

1 represents the wheel of which 2 is the resilient tire and 3 the rim. Referring to Fig. 2, the tire is shown provided with a series of channels 4 which extend entirely through the length of the tire. In other words, these channels in the completed tire are endless. They are preferably diamond or lozenge-shaped in cross section, and in Fig. 2 are seen with their normal conformation unchanged by compression, whereas in Fig. 3 they are shown in the form assumed under maximum compression. Any compression less than the maximum will necessarily give a lesser degree of distortion to the normal cross sectional shape of the channels. The upper row of channels 4 is preferably arranged in the arc of a circle, or substantially such, conforming to the exterior transverse shape of the main part of the tire. A lesser number of such channels— here shown two in number — are placed nearer to the inner circumference, one on each side of the center. The tread or outer surface of the tire is given a formation common in tires of this class.

An annular inverted V-shaped cavity 5 is formed in the tire, and extends to a point about midway the depth thereof, and outwardly-projecting shoulders 7 are provided the inner lines of which are coincident with the inner walls of the cavity. These shoulders are each provided with a bead 7ª which enters a bent recessed portion 8ª of the metallic rim 8. These bent portions fit closely over the beads 7ª of the shoulders 7. The central portion of the rim 3 is given a curve 8ᵇ which besides imparting increased strength to the rim performs an important result now to be described.

As seen in Fig. 2, the curve 8ᵇ has no active function, there being no compression of the resilient tire; but from Fig. 3 it will be seen that in the maximum compression of the tire the channels 4 and the cavity 5 have necessarily changed shape due to the distortion of the body of the tire, and that portions of the wall lines of said cavity have been given an inward curvature causing the portions of the tire at each side of the center to close in and seat upon the curved portion 8ᵇ of the rim. This has been effected without any diminution in the hold of the bent portions 8ª of the rim 3 upon the beads 7ª of the tire. Immediately on the discontinuance of the compression, whether of a temporary or more permanent character, the cavity 5 will resume its normal shape, the parts of the body of the tire releasing themselves from the curve 8ᵇ of the rim.

It will be observed that under full compression of the tire the cavity 5, while changing shape, still remains, and that a considerable portion of each of the walls of the cavity is firmly seated upon the curved portion 8ᵇ of the rim, as also upon the part of the rim connected at each side to the curved part. It is essential to my invention that the V-shaped cavity shall extend well up into the body of the tire—say to about the axial center thereof—so that a considerable part of the interior of the body shall be seated upon the rim when the tire is in compression. My invention differs from a construction in which when the tire is under compression the entire surface of the inner periphery thereof is air-cushioned.

I provide a rim having not only the bent recessed portions which immovably receive the beads 7ᵃ of the tire but also a main inner surface in the form of an undulatory curve which, as seen in Fig. 3, forms an almost continuous seat for the tire when under maximum compression. The inverted V-shaped cavity 5 of the tire permits of the distortion of the latter under pressure as shown in said figure, and the rounded or undulatory area of rim seat performs its function without cutting, wearing or other injury to the tire, the sides or walls of said cavity, in the compression of the tire, rolling over and upon said surface of the rim in natural lines of movement. I am not aware that any such jointly coöperating constructions of tire and rim have heretofore been brought together.

My invention produces a tire and rim possessing great strength, imparting to the tire a high degree of resiliency and adaptability to compression and restoration to shape after compression, and furthermore furnishing a firm and substantial seat for the tire when compressed.

The invention herein differs from that set forth in my application Serial No. 586,833 in the shape of the cavity in the tire and also in that of the outwardly flared sections of the tire which engage the rim pockets, and furthermore, in that in my present invention no continuous spaces, as in Serial No. 586,833, are left between the outer edges of the said outwardly flared sections and the walls of the inwardly-opening rim pockets whereby a sliding movement of said outwardly flared sections in said rim pockets provided for in said application is herein prevented and rendered unnecessary.

In the present invention, as contradistinguished from that of Serial No. 586,833, the connection between the annular bead-like portions of the tire with the clamping parts of the rim is immovable, and the resiliency of the tire depends upon the special curved shape given to the inner walls of the cavity formed in the tire which admits of the bending over and rolling of parts of the side walls of the cavity upon parts of the undulatory tire-supporting surface of the rim. It is necessary, in the present invention, that under normal conditions the inner walls of the cavity shall be of such curvature as shall admit of the tangential meeting of the main curves with the smaller curves of the beads, as seen in Fig. 2, which shows the tire in its uncompressed condition, whereby, when compression occurs, the curved lines or surfaces which are intended to be pressed upon and brought to the shape of the tire-supporting surface of the rim shall assume the sinuosity shown in Fig. 3. It is to be noticed that there is no break or offsetting in the combined curves of either the tire cavity or the tire-supporting surface of the rim, the effect, in the compression of the tire, being to produce a natural rolling or settling down of the specially formed more resilient portions of the tire upon seats accurately shaped to receive them, this being effected without injury to the material of the tire.

I claim:—

A resilient cushion tire having a central annular cavity in its inner side and a bead on each side of the mouth of said cavity projecting outwardly from the edges of the tire, said cavity being approximately V-shaped in cross section with curved apex extending into the body of the tire substantially to the center thereof, and symmetrically curved walls diverging toward said beads and continuous with the surfaces thereof, said divergence gradually lessening the thickness of the tire in the direction of the beads, combined with a metallic rim having at each edge an inwardly bent portion adapted to clamp a bead of the tire, and a sinuous tire-supporting part comprising a central curved portion and at each side thereof a reversely curved part continuing said central curved portion and also uniting with one of said inwardly bent edge portions whereby, under varying loads, the tire will be compressed more or less and the walls of said cavity caused to approach each other, and under maximum load will bear upon and be supported directly by the curved portions of the rim surface.

In testimony whereof I affix my signature in presence of two witnesses.

ALBERT H. HENDERSON.

Witnesses:
JAMES F. JOHNSON,
C. HOWARD MILLIKIN.